United States Patent [19]
Koch

[11] Patent Number: 4,716,844
[45] Date of Patent: Jan. 5, 1988

[54] PROCESS AND DEVICE FOR THE NITRIC OXIDE-FREE GENERATION OF STEAM WITH FOSSIL FUELS

[76] Inventor: Christian Koch, Mühlweg 13, 8570 Pegnitz, Fed. Rep. of Germany

[21] Appl. No.: 865,721

[22] PCT Filed: Dec. 19, 1985

[86] PCT No.: PCT/EP85/00722
§ 371 Date: Apr. 14, 1986
§ 102(e) Date: Apr. 14, 1986

[87] PCT Pub. No.: WO86/03821
PCT Pub. Date: Jul. 3, 1986

[30] Foreign Application Priority Data
Dec. 22, 1984 [DE] Fed. Rep. of Germany ....... 3447147

[51] Int. Cl.⁴ .......................... F23B 7/00; F23G 5/00
[52] U.S. Cl. ..................................... 110/341; 110/229; 110/347
[58] Field of Search ............... 110/229, 230, 231, 345, 110/347

[56] References Cited
U.S. PATENT DOCUMENTS

| 3,818,869 | 6/1974 | Blaskowski | 122/5 |
| 4,290,269 | 9/1981 | Hedstrom et al. | 60/670 |
| 4,336,769 | 6/1982 | Daman | 122/4 D |
| 4,419,940 | 12/1983 | Cosar et al. | 110/229 |
| 4,430,094 | 2/1984 | Gorzegno | 122/4 D |
| 4,437,416 | 3/1984 | Ishii et al. | 110/347 |
| 4,558,651 | 12/1985 | Ying et al. | 110/347 |
| 4,602,573 | 7/1986 | Tanca | 110/229 |

Primary Examiner—Henry C. Yuen

[57] ABSTRACT

The generation of heat from the fossil fuels coal, oil and gas is possible nearly free from nitric oxide if the materials are burned in a multi-stage combustion process. The fuel, which, in some cases, contains ash, is admixed with highly heated air and steam and reacted to fuel gas in a ceramically fully lined melting chamber. The resulting fuel gas is cooled for the preheating of the air and steam generation, purified from solids and hydrogen sulfide, and fed into a flameless catalytic or noncatalytic combustion stage. In the combustion stage, because of the low caloric value of the admitted gas, only a temperature clearly below 1300° C. is reached in the ceramic combustion unit, so that the combustion takes place nearly free from nitric oxide.

3 Claims, 2 Drawing Figures

PROCESS AND DEVICE FOR THE NITRIC OXIDE-FREE GENERATION OF STEAM WITH FOSSIL FUELS

BACKGROUND OF THE INVENTION

1. Field of the Invention

The invention relates to a process and device by which fossil fuels may be converted nearly nitric oxide-free into heat and transferred in a steam generator into the water or steam.

2. Description of the Prior Art

In the field of steam generator construction, steam generators heated with fossil fuels are normally equipped with a fire chamber in which the fossil fuel, which may be coal, oil or gas, is burned in a flame.

Said combustion produces at least locally temperatures which are close to the theoretical combustion temperature. Said temperatures are above the kinetic temperature for forming nitric oxides of 1300 centigrade.

This produces varying concentrations of nitric oxide in the off-gas depending on the firing principle, which may be a cyclone firing or front firing system, a combustion chamber with an elongated flame or also a fluidized bed-type firing system; however, more or less large combustion zones with nearly stoichiometric mixture formation and with a clearly notable formation of nitric oxide will always occur locally.

Now, the objective of the invention is to create at all sites or in all locations of the steam generator system conditions such that no formation of nitric oxide is possible. This requires creating in all locations conditions of such a type that the nitric oxide formation temperature of 1300° C. is not exceeded in an oxidizing atmosphere.

SUMMARY OF THE INVENTION

This is not possible in a flame combustion. For this reason, the combustion takes place flamelessly in excess air in a ceramic system, or catalytically, if need be.

A gasification step with subsequent cooling of the gases produced in said step is preconnected to the flameless combustion in the ceramic system. Said gasification stage consists of a ceramically insulated combustion chamber, preferably a cyclone combustion chamber, which converts the fuel used, for example coal, with a partial stream of air into a fuel gas with a low caloric value.

Thus the conversion of the fossil fuel in the first stage is a partial oxidation. When adding about 45 to 70% of the theoretic amount of air for the combustion, approximately 35 to 55% of the combustion heat is generated in said first stage because a portion of the combustion heat so generated is consumed by the heat-consuming reactions.

The gasification temperature adjusts itself to about 1500° to 1900° C. The high gasification temperature permits on the one hand the discharge of the slags in the liquid state; on the other hand, the reaction is accelerated in such a way that a relatively complete reaction of the coal or solids-containing oils is assured.

A precondition for said high temperature is the well-insulating ceramic lining of the combustion chamber, for example with wear-resisting and insulating ceramic materials such as silicon nitrite and silicon carbide The formation of the liquid ash is additionally promoted by the fact that in the reducing atmosphere of the gasification stage, the ash particles remain liquid for a longer period at lower temperatures, which means that the lower temperatures found in smaller plants and in the initial phase will suffice to achieve a liquid ash discharge.

However, said lower ash melting point of the 1st stage means that the fission gas has to be cooled in the injection space to lower temperatures before entering the contact heating surface areas. Said temperature is about 900° C. without additives in the coal, and up to about 1050° C. with additives added to the coal.

For achieving said high gasification temperature or temperature of partial oxidation, it is necessary, furthermore, to preheat the combustion air to a relatively high temperature ranging between 300° and 700° C. Said preheating takes place in the heat exchangers or air heater, which are connected after the oxidation stages.

The heat exchangers connected downstream of the oxidation stages contain not only the air heater, but also heating surfaces for heating the water, for the evaporation and for superheating steam. In this way, the gases are cooled after the gasification and combustion stages to temperatures of 200° C. and lower.

Cooling of the gasification gases to such low temperatures is useful because the gas is purified from contaminants not following the combustion, but rather between the gasification and combustion steps. In said purification step, the sulfur-containing contaminants are separated in the form of hydrogen sulfide.

Contrary to the commonly used absorbents it is proposed within the framework of the present invention that the hydrogen sulfide is absorbed in lime milk suspension or in an absorption unit operated with lime milk suspension. In said absorption stage, the lime milk reacts with the hydrogen sulfide to calcium sulfide, which can be readily reacted to calcium oxide and sulfur by heating with gypsum. Various other regeneration processes are possible with said product; however, the use of gypsum for the regeneration permits reducing the future heap of gypsum.

The purified fuel gas, which is cooled to under 100° C., is preheated in a heat exchanger before it is passed on for the combustion. Preferably, the heat for said preheating of the gas is supplied from a separate heat recovery circuit. The heat is recovered via a water circuit which, on the heat-receiving side, cools the unpurified fuel gas, and which, on the heat-discharging side, heats the cold purified gas via a compact heavy-duty heat exchanger. Since temperatures in excess of 100° C. may occur on the water side in the heat exchanger of the heat-receiving side, the water circuit is provided with prepressure, for example with a nitrogen cushion. Also, it is possible to interconnect a heat pump between the purified and the unpurified gas.

The combustion of the purified fuel gas in the 2nd stage with the remaining combustion air required for completely burning the fuel used takes place in a ceramic system, which may be provided in the form of a perforated stone plate or honeycombed ceramic system.

For the purpose of accelerating the reaction, said ceramic system is provided with a catalytic addition, which is applied to the ceramic unit or wash-coat coated ceramic unit, said catalytic addition containing 50% to 95% lanthanum 5% to 50% cerium It has been found that it is useful in evaporation plants to use for the evaporation in a straight-tube heat exchanger the heat liberated by the oxidation of the fuel gases. Such a straight-tube heat exchanger, in spite of its unfavorable heat transfer conditions, is small or compact with a simpler design than a comparable evaporator with tubes disposed transversely to the stream of gas.

The combustion in the ceramic combustion unit saves flame space, so that the heat exchanger units may be arranged directly following said ceramic combustion unit. The combustion temperature, without taking into account the discharge of heat from the combustion zone, is below 1300° C.

The flue gas exiting from the steam generator following said reaction is almost completely free from nitric oxide and sulfur.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows the device for carrying out the process of the invention. In FIG. 1, reference numeral 1 identifies the fuel feed, 2 the gasification vessel, 3 the ceramic lining, 4 the feed of preheated air, 5 the feed of steam, and 6 identifies the discharge of the slag.

Figure 1:
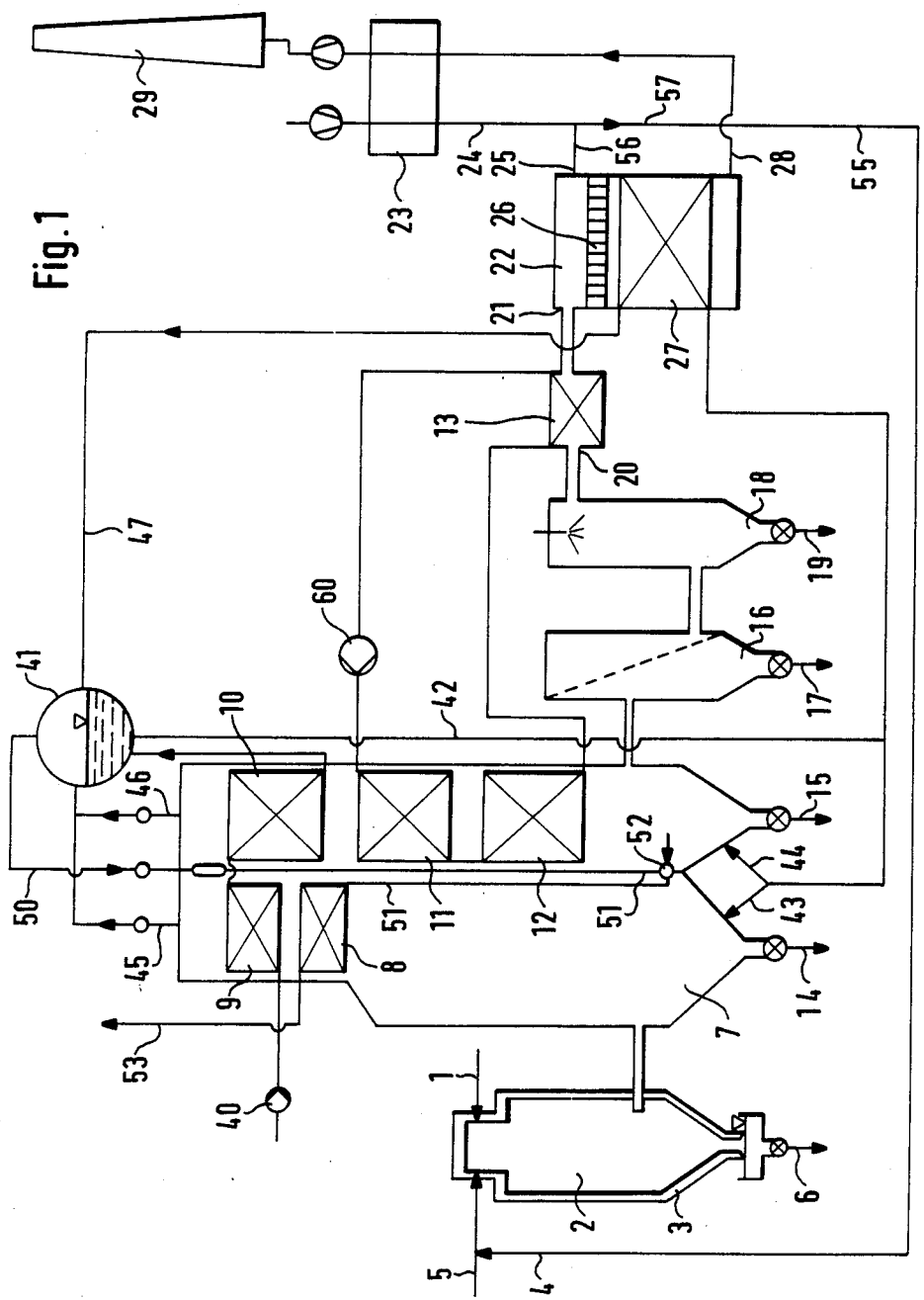
FIG. 1 is a schematic flow diagam showing the process according to the present invention.

Said gasification chamber is followed by the radiation heat exchanger 7, which is formed by fin tubes. A portion of said wall heating surfaces may be designed in the form of superheaters. The heating surfaces 8, 9 and 10 may serve for preheating the air, heating the water and vaporizing the water. The deposits of flue dust are discharged by way of 14 and 15.

Reference numerals 11 and 12 designate the plain-tube heat exchangers for the unpurified fuel gas of the heat recovery circuit; 13 designates the compact heavy-duty heat exchanger on the side of the purified gas, and 14 identifies the circulating pump for the circulating water.

Reference numeral 16 designates the flue dust purification of the gasification gas; the remaining separated solid particles are discharged by way of 17.

Reference numeral 18 designates the gas purification unit for purifying the gasification gas. Said unit serves for removing the hydrogen sulfide, for example by feeding in the lime milk 60, which reacts to lime sulfide. The reaction product is discharged by way of 19.

At 20, the purified gasification gas enters a gas preheater 13, from which it enters the flameless catalytic combustion chamber 22 after it has been heated at 21. A portion of the air 24, which has been heated in the regenerative heat exchanger 23, also enters said combustion chamber by way of the duct 25.

The reaction of the gasification gas with air takes place in the ceramic unit 26. The off-gas exiting from said ceramic unit cools in the vertical tubes of the straight-tube type heat exchanger 27.

The cooled off-gas exits from the heat generator at 28 and is passed into the stack 29.

The feed water pump 40 conveys the feed water through the preheaters 9 and 10 and into the drum 41. By way of the drop tubes 42, said feed water is passed into the fin walls 43 and 44 of the fuel gas cooling line and into the straight-tube heat exchanger 27 of the oxidation stage. Via the pipelines 45, 46 and 47, the boiling water is passed into the drum 41, where steam is separated also. Via 50, the saturated steam is passed into the center superheater 51 and from there via the injection control 52 into the final superheater 8. The fresh steam is fed to the turbine by way of the pipeline 53.

The special features of the process of the invention are explained in greater detail in the following with the help of a special exemplified procedure.

The energy of a stream of coal of 4.17 tons/h, which conforms to a thermal output of 30 MW with a lower caloric value of 6733 kcal/kg and an assumed plant efficiency degree of 92%, is to be reacted free from nitric oxide and used for the generation of superheated steam with a pressure of 64 bar and a temperature of 520° C.

30° air with a volume stream of 8.24 m3iN/s flows through a rotary LUVO 23 and is heated in its course to 350° C. by the off-gases of the oxidation process. A partial stream of 5.32 m3iN/s of said 350° C.-air 57 is branched off and passed via 55 into the fission gas tract. Together with the finely ground or crushed fossil coal 1, which has a water content of about 3% by weight, and a steam infeed 5 of 785 kg/h, said 350° C. air is reacted in the melting chamber 2 at a temperature of about 1700° C. to a fission gas stream of 6.76 m3iN/s.

In the empty tract of the radiation evaporator 7, the 170° C. fission gas is cooled by radiation and convection to 900° C. before it comes into contact with the first contact heating surface 8, which is the final superheater. On the course through the contact heating areas 8, 9 and 10 of the fission gas tract, the temperature of the fission gas is reduced to 160° C. The fission gas is cooled further to approximately 80° C. as it is passing through the heat exchangers 11 and 12 of the heat recovery circuit. The gas exits from the fission gas tract with said temperature (80° C.) in order to be relieved in a dedusting unit 16 from its residual solid particles and subsequently relieved from its sulfurous compounds in a disulfurization unit 18. At 20, the purified gas having a temperature of about 50° C. enters the heavy-duty heat exchanger 13, from which it exits with a temperature of 120° C. in order to pass into the combustion chamber of the combustion chamber tract 22. Here, the fission gas is admixed with the remaining partial stream of the 350° C. air 56 of 2.92 m3iN/s, and in a structured ceramic unit 26, it is then catalytically reacted to off-gas at 1283° C. and 9.26 m3iN/s. No nitric oxide is formed in said reaction because the temperature required for forming nitric oxide is not reached in any location within the combustion zone.

Furthermore, in the combustion process, the proportions of ammonia received from the fuel, because of the special composition of the ceramic system, burn only to $N_2$, but not to NO.

The off-gas so formed has an excess of air of only 3% to 8%. The phenomena of corrosion are clearly reduced due to the extreme freedom from contaminants, permitting lower off-gas temperatures.

In the straight-tube heat exchanger 27, the off-gas is cooled to 407° C., and it is subsequently cooled further to 130° C. in the rotary LUVO 23. The 130° off-gas is then discharged by way of a blower and via the smoke stack 29.

The 120° C. stream of feed water of 10.2 kg/s is pumped by the feed water pump 40 through the ECO's 9 and 10 of the fission gas tract and heated on its way to 197° C. With said temperature, it is passed into the drum 41, from where it flows in partial streams through the drop pipes 42 on the one side into the fin walls of the fission gas tract and on the other side onto the pipe jacket side of the straight-tube heat exchanger 27 of the combustion chamber tract.

At the end of the two units, saturated steam or boiling water flows via 45, 46 and 47 into the drum 41, said steam or water having a temperature of 280° C. The saturated steam is withdrawn from the steam chamber of said drum and passed via 50 to the wall superheater 51, where the steam is heated in a 1st stage to 420° C. In an injector unit 52, about 0.4 kg/s feed water with a temperature of 120° C. is added, which cools the superheated steam to a temperature of 382° C. With said temperature the steam arrives in the final superheater 8, where it is brought into its concession state of 520° C. and 64 bar in order to be subsequently supplied to the turbine by way of 53.

The device according to the invention is explained in greater detail in the following with the help of an embodiment The air 24 for the gasification and combustion passes through the LUVO 23 (LUVO=air preheater), which has a diameter of about 4 meters, and is subsequently divided into two partial streams 56 and 57.

The one partial stream 57 passes into the fission gas tract where it is mixed with the crushed fossil coal 1 and the steam 5 in a ceramically lined, fully insulated cyclone-type melting chamber 2 having two burners of the same size. Said melting chamber 2 has a diameter of approximately 4.2 meters and a cylindrical height of about 4.2 meters, too. The liquid ash is withdrawn with exclusion of air via the bottom end of the cylindrical part and by way of the funnel connected to said bottom part. The fission gas is passed into the radiation zone of the steam generator by way of a duct 2 sized about 2.5 meters by 0.75 meter, which duct slightly projects into the bottom part of the melting chamber. In the 1st part of the steam generator, which is made up from fin-type tubes, the hot fission gas is cooled in an empty tract with an edge length of 4.0 m and 3.5 m and a height of about 6.5 m before it comes into contact with the first contact heating surface. In a rectangular second tract of the base surface sized 2.5 m by 4.0 m, the fuel gas is cooled to a temperature sufficiently low to permit relieving said fuel gas from its solid particles in a fabric filter unit 17.

In a following desulfurization unit 18, which has a diameter of about 3.5 m and a height of about 4.5 m, the sulfurous compounds are removed from the fission gas. In a heavy-duty heat exchanger 13 having the outside dimensions of 1.8 m by 1.38m by 0.8 m, the fission gas is heated again and subsequently fed into the combustion chamber tract.

In said tract, in a ceramically lined combustion chamber 22, which is square with an edge length of 2.2 m or equivalent with a diameter of 2.5 m, the gas is mixed with the remaining or other partial stream of air from the LUVO 23. In a ceramic unit 26 disposed beneath the combustion chamber space, the reaction to off-gas takes place catalytically. The heat liberated in said reaction is eliminated in a straight-tube-type heat exchanger 27. Said heat exchanger is comprised of a base plate having the same dimensions as the combustion dhamber; the height of said heat exchanger is 3.0 meters. The off-gas flows through 8640 ISO-pipes (20×2.0).

Figure 2:
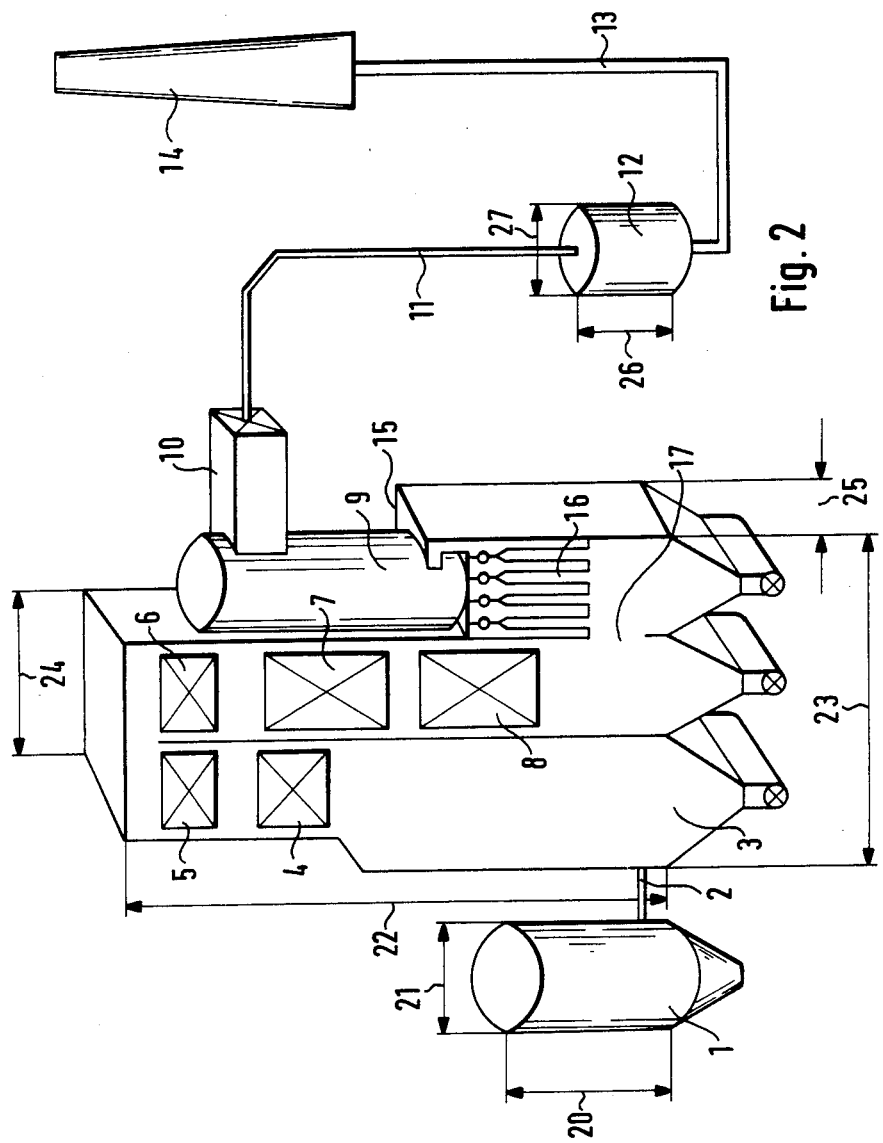
FIG. 2 is a schematic representation of a compact heat generation unit with integrated gas purification according to the present invention.

FIG. 2 shows the individual components of the device of the invention in a compact heat generation unit with integrated gas purification with a thermal output of 30 MW.

Reference numeral 1 designates the fully ceramic, insulated gasification chamber with liquid ash discharge. Said chamber is connected to the radiation evaporator 3 by way of the connecting duct 2.

Said radiation evaporator 3 is comprised of fin-type tubes, through which water is circulating.

The total fission gas tract is formed by the radiation evaporator and the second part consisting of the superheater and preheater parts, which are equipped with the heat exchanger blocks 4, 5 and 6 and with the heat recovery circuits 7 and 8.

Reference numeral 17 designates the opening leading to the dedusting unit 16, which consists of hose filters. Numeral 15 identifies the duct connecting the dedusting unit with the desulfurization unit 9, which unit 9 comprises the heavy-duty heat exchanger 10. The connecting duct 11 conducts the purified gas into the combustion chamber tract 12 with the structured ceramic units and the straight-tube evaporator. The total off-gas is passed to the smoke stack 14 via the off-gas duct 13.

The main dimensions of the unit shown in FIG. 2 are as follows: The gasification chamber (1) has a height (20) of 4.20 meters and a diameter (21) of 4.20 meters also. The dimensions of the combustion gas cooling and purification part are as follows: The height (22) is 12.0 meters, the bottom width (23) comes to 8.0 meters, the top width (24) to 5.0 meters, and the total depth (25) is 4 meters. The combustion chamber tract (12) has a height (26) of 3.0 meters and a diameter (27) of 2.5 meters.

By placing the combustion chamber unit (12) on top of the melting chamber (1), the total heat generation unit may be designed even more compact

What is claimed is:

1. In a process for the nitric oxide-poor reaction of fossil fuels with ash contents in a two-stage combustion process consisting of a first gasification stage with partial oxidation for producing fuel gas, and a second stage for the combustion of the fuel gas produced in the first stage, the improvement comprising:

reacting the fossil fuels in a ceramically insulated first stage gasification chamber with air preheated to 300° to 700° C.

cooling the resulting gasification gases first to 900° to 1000° C. in a radiation zone with fin-type tubes connected following the gasification chamber and then to low temperatures in a subsequently connected heat exchanger system and removing solids and hydrogen sulfide components carried along by said gases; and mixing said gases with the remaining combustion air and completely burning substantially free from nitric oxide at below 1300° C. in a second stage ceramic combustion unit consisting of structured ceramic layers having a length from 10 to 100 times their bore diameter, said second stage including a combustion catalyst which contains as an active substance 50 to 95% lanthanum and 5 to 50% cerium.

2. The process of claim 1, wherein the gasification stage is carried out at temperatures in the range of 1400° to 1900° C., and the ash particles resulting therefrom are collected in the liquid state.

3. The process of claim 1, wherein the gasification chamber has a fully ceramic lining of materials having the high thermal resistance and smoothness of materials taken from the group consisting of silicon nitrite, silicon carbide or chromium corundum.

* * * * *